(12) United States Patent
Huggins

(10) Patent No.: US 9,787,108 B2
(45) Date of Patent: Oct. 10, 2017

(54) ENHANCED BATTERY MANAGEMENT SYSTEM

(71) Applicant: TWS (Macau Commercial Offshore) Limited, Macau (CN)

(72) Inventor: Mark Wayne Huggins, Stirling (GB)

(73) Assignee: TWS (MACAU COMMERCIAL OFFSHORE) LIMITED, Macau (CN)

( * ) Notice: Subject to any disclaimer, the term of this patent is extended or adjusted under 35 U.S.C. 154(b) by 74 days.

(21) Appl. No.: 14/440,285

(22) PCT Filed: Nov. 1, 2013

(86) PCT No.: PCT/GB2013/000467
§ 371 (c)(1),
(2) Date: May 1, 2015

(87) PCT Pub. No.: WO2014/068271
PCT Pub. Date: May 8, 2014

(65) Prior Publication Data
US 2015/0256005 A1    Sep. 10, 2015

(30) Foreign Application Priority Data

Nov. 5, 2012    (GB) .................................. 1219863.6
May 7, 2013    (CN) .......................... 2013 1 0163703

(51) Int. Cl.
*H02J 7/00* (2006.01)
*H01M 10/42* (2006.01)
(Continued)

(52) U.S. Cl.
CPC .......... *H02J 7/0021* (2013.01); *B60L 11/1861* (2013.01); *B60L 11/1866* (2013.01); *H01M 10/425* (2013.01); *H01M 10/482* (2013.01); *H02J 7/0018* (2013.01); *B60L 2240/545* (2013.01); *B60L 2240/547* (2013.01); *B60L 2240/549* (2013.01);
(Continued)

(58) Field of Classification Search
CPC ...................................................... H02J 7/0021
USPC ........................................................... 320/116
See application file for complete search history.

(56) References Cited

U.S. PATENT DOCUMENTS

2003/0146737 A1    8/2003   Kadouchi et al.
2006/0022639 A1    2/2006   Moore
(Continued)

FOREIGN PATENT DOCUMENTS

| WO | 2008095315 A1 | 8/2008 |
| WO | 2010001090 A2 | 1/2010 |
| WO | 2010106257 A1 | 9/2010 |

OTHER PUBLICATIONS

EPO International Search Report for PCT/GB2013/000467, Feb. 26, 2014, 4 pages.
(Continued)

*Primary Examiner* — Sun Lin
(74) *Attorney, Agent, or Firm* — Drinker Biddle & Reath LLP

(57) ABSTRACT

A battery management system and a method for enhanced battery management of a battery containing a number of cells. The method and system measures the cell capacity of two or more of said cells, ranks the cells in order of their cell capacity values and calculates a value for a cell specific supporting current for the measured cell, for a given load, based upon the ranked cell capacity values. Calculated cell specific currents are then provided to the cells.

38 Claims, 11 Drawing Sheets

(51) Int. Cl.
  *H01M 10/48* (2006.01)
  *B60L 11/18* (2006.01)
(52) U.S. Cl.
  CPC .. *H01M 2010/4271* (2013.01); *Y02T 10/7005* (2013.01); *Y02T 10/7044* (2013.01); *Y02T 10/7055* (2013.01); *Y02T 10/7061* (2013.01)

(56) References Cited

U.S. PATENT DOCUMENTS

2006/0097698 A1   5/2006   Plett
2010/0194339 A1   8/2010   Yang et al.
2012/0086399 A1   4/2012   Choi

OTHER PUBLICATIONS

EPO Written Opinion for PCT/GB2013/00467, Feb. 26, 2014, 5 pages.
GB Search Report for GB1219863.6, Jan. 23, 2013, 1 page.

ENHANCED BATTERY MANAGEMENT SYSTEM

The present invention relates to a battery management system and in particular to one which improves upon the invention described in patent document WO2006/082425.

BACKGROUND

Battery Management Systems such as described by WO2006/082425 A1 are instrumental in achieving enhanced battery performance. The Battery Management System as described by WO2006/082425 A1 is capable of actively balancing the battery cell capacities through the use of a distributed integral charger formed by DC/DC converters attached to each series connected cell.

To enable control of cell capacity, embodiments of the invention described in WO2006/082425 disclose the coulometric determination of each series connected cell capacity by measuring the current in each cell. This is a costly and difficult measurement to implement due to the level of current and number of cells.

Even with the use of high quality accurately matched cells the operation of a large multi cell battery will provide internal thermal gradients that will force uneven cell ageing. Thus over the life of any battery pack cells will age at different rates. Although a battery may be shipped with all cells matched, over time they will drift and weak cells will be generated through normal operational use.

Two of the key technical challenges associated with the large multi cell electrochemical energy storage application are providing accurate battery state of charge determination over the battery operating life and providing predictable operational life to reduce warranty liability The present invention seeks to provide improvements to the determination of battery state of charge, and enable extended operational life.

SUMMARY OF THE INVENTION

It is an object of the invention to provide an active cell balancing system and method that extends both the operating life and effective capacity of a multi cell battery pack.

In accordance with a first aspect of the invention there is provided a method for enhanced battery management of a battery comprising a plurality of cells, the method comprising the steps of:
  measuring the cell capacity of two or more of said cells;
  ranking the cells in order of their cell capacity values;
  calculating a value for a cell specific supporting current for the measured cell, for a given load, based upon the ranked cell capacity values; and
  providing the calculated cell specific currents to the cells.

Preferably, the cell specific supporting currents are calculated to provide a higher current to cells with lower cell capacity values in order to minimise the relative mismatch between cell capacity values in different cells.

Advantageously, by supporting the weaker cells from the battery pack the effective delivered battery capacity can be increased by removing the restriction of the series connected weak cell (lower capacity cell). Also, by supporting the weak cells with additional current the effective stress on the weak cells is reduced thus ensuring that every series connected cell will age at a comparable rate thereby extending the battery operational life.

Preferably, the step of ranking the cells comprises ranking in order of cell capacities normalised to the highest capacity cell.

Preferably, the step of measuring the cell capacity of two or more of said cells comprises coulometric determination of each cell capacity.

Preferably, the step of measuring the cell capacity of two or more of said cells comprises constantly acquiring cell capacity data.

Preferably, the step of measuring the cell capacity of two or more of said cells comprises measuring the current of said cells Preferably, the step of measuring the cell capacity of two or more of said cells comprises, measuring the battery charge current and discharge current and summing it with the cell charge current to determine each cell current which is then integrated to obtain a measure of individual cell capacity.

Advantageously, because the cell charge current has a lower value it requires a smaller and cheaper measuring device.

Preferably, the battery charge current and discharge current is measured using a current sense element.

Preferably, the cell charge current derived from the DC/DC charger is measured using a current sense element.

Preferably, the current sense element is embedded in the battery.

Preferably, the current sense element carries both the battery load current and the primary support current the values of which are used to derive the cell support currents.

Preferably, the cell capacity measurement is temperature compensated to provide a dynamic measurement responsive to each cell temperature.

Preferably, the cell capacity measurement is current compensated to provide a dynamic measurement responsive to each cell current.

Preferably, effective battery capacity can be expressed as an average of all the compensated cell capacities.

Preferably, the support currents are dynamically adjusted with changing battery load.

Preferably, the calculated support currents are provided to the cells by a DC/DC converter.

In accordance with a second aspect of the invention there is provided a battery management system comprising:
  a cell regulator;
  an cell capacity measuring device;
  a processor which receives measured cell capacity values from cells contained in a battery and ranks the cells in order of their cell capacity and which is programmed to calculate a value for a cell support current based upon the ranked cell capacity values and provides an output to the cell regulator to provide the calculated cell specific currents to the cells.

Preferably, the processor is programmed to calculate cell specific supporting currents which provide a higher current to cells with lower cell capacity values in order to minimise the relative mismatch between cell capacity values in different cells.

Preferably, the processor ranks the cells in order of cell capacities normalised to the highest capacity cell.

Preferably, the cell capacity measuring device measures the cell capacity of two or more of said cells using coulometric determination of each cell capacity.

Preferably, the cell capacity measuring device measures the cell capacity of two or more of said cells by constantly acquiring cell capacity data.

Preferably, the cell capacity measuring device measures the cell capacity of two or more of said cells by measuring the current of said cells Preferably, the cell capacity measuring device measures the battery charge current and discharge current and the processor sums it with the cell charge current to determine each cell current which is then integrated to obtain a measure of individual cell capacity.

Preferably, the cell capacity measuring device is a current sense element.

Preferably, the cell capacity measuring device also measures the cell current derived from the cell regulator.

Preferably, the current sense element is embedded in the battery.

Preferably, the current sense element carries both the battery load current and the primary support current the values of which are used to derive the cell support currents.

Preferably, the processor is programmed with an algorithm to provide a correction factor which compensates the measured cell capacity to account for variations in one or more physical parameters for each of the measured cells.

Preferably a physical parameter is temperature.

Preferably a physical parameter is current.

Preferably, the processor is programmed to calculate an effective battery capacity expressed as an average of all the compensated cell capacities.

Preferably, the processor is programmed to dynamically adjust the support currents with changing battery load.

Preferably, the calculated support currents are provided to the cells by a DC/DC converter.

Preferably, the processor comprises a first processing means located at or near the cells of the battery and which implements the correction factor algorithm Preferably, the processor comprises a central processing unit which accesses each cell's processed compensated data to determine the effective battery capacity for that sampled operating state.

In accordance with a third aspect of the invention there is provided a computer program comprising program instructions for implementing the method of the first aspect of the invention.

BRIEF DESCRIPTION OF THE DRAWINGS

The present invention will now be described by way of example only, with reference to the accompanying drawings in which.

DETAILED DESCRIPTION OF THE DRAWINGS

Figure 1:
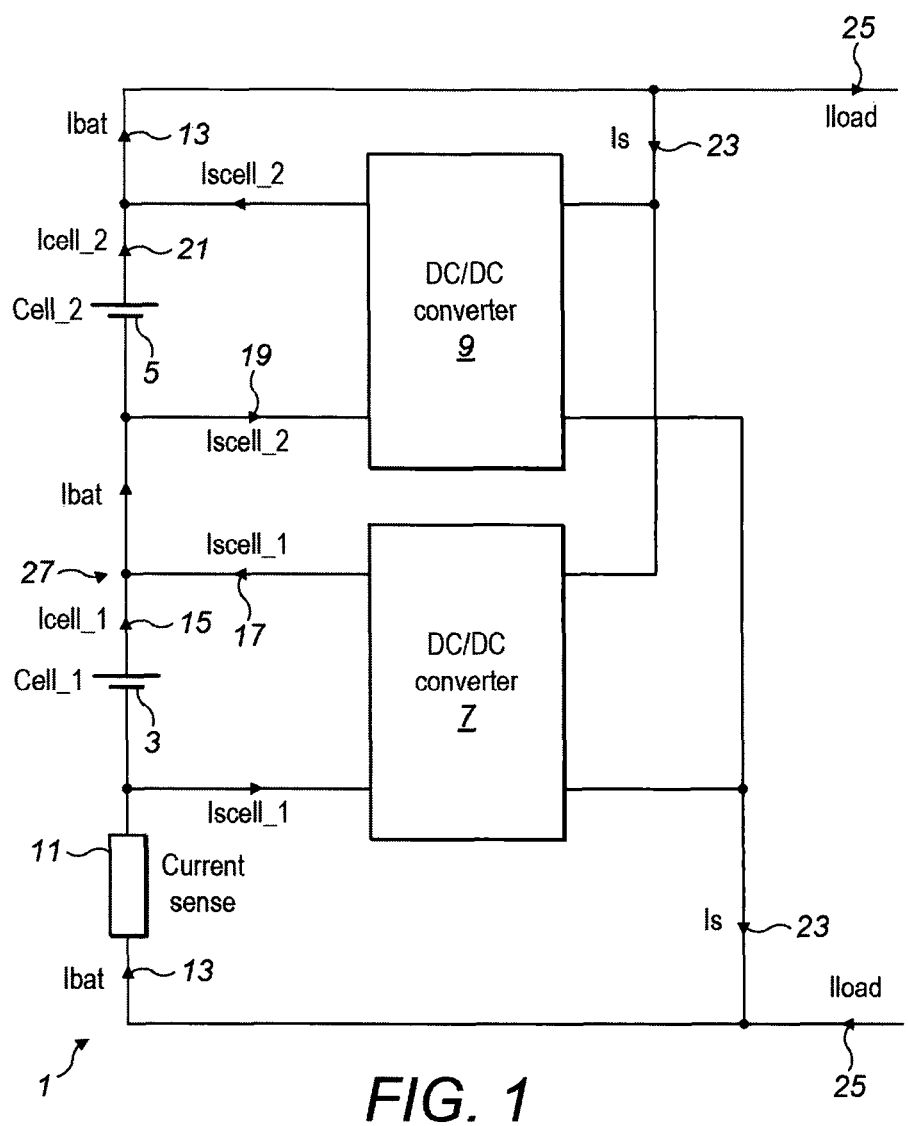
FIG. 1 is a schematic diagram of an example of a battery in accordance with the present invention.

FIG. 1 shows a schematic circuit diagram of a battery and DC/DC converters used in a battery management system in accordance with the present invention. In order to illustrate the relationship between currents at different points in the circuit for a battery as clearly as possible, this figure has a battery with only two cells. It will be appreciated that the present invention is able to provide active cell balancing for batteries with a large number of cells such as would be found in the battery of an electric vehicle.

FIG. 1 shows the first cell 3 connected in series with a second cell 5. Each of the cells 3 and 5 has a DC/DC converter 7, 9 respectively connected across the respect of cell. The current sensor 11 is used to measure the current through the circuit. As well as the physical features of the circuit 1, the current, its direction and the component with which the current is associated are identified a number of locations within the circuit.

Accordingly:

$I_{Bat}$ 13 is the battery current;

$I_{cell1}$ 15 is the current through the first cell 3 Is cell 17 is the support current for the first cell 3;

$I_{scell2}$ 19 is the support current for the second cell5;

$I_{cell2}$ 21 is the current through the second cell 5 Is 23 is the total support current in the circuit load 25 is the current load in the circuit; and $I_{bat}$ 27 is the current of the identified point in the circuit.

The circuit of FIG. 1 shows the manner in which the various currents may be summed. In general $$I_{bat}I_s+I_{load}$$

At point 27, $I_{bat}=I_{cell1}+I_{scell1}$

Figure 2:
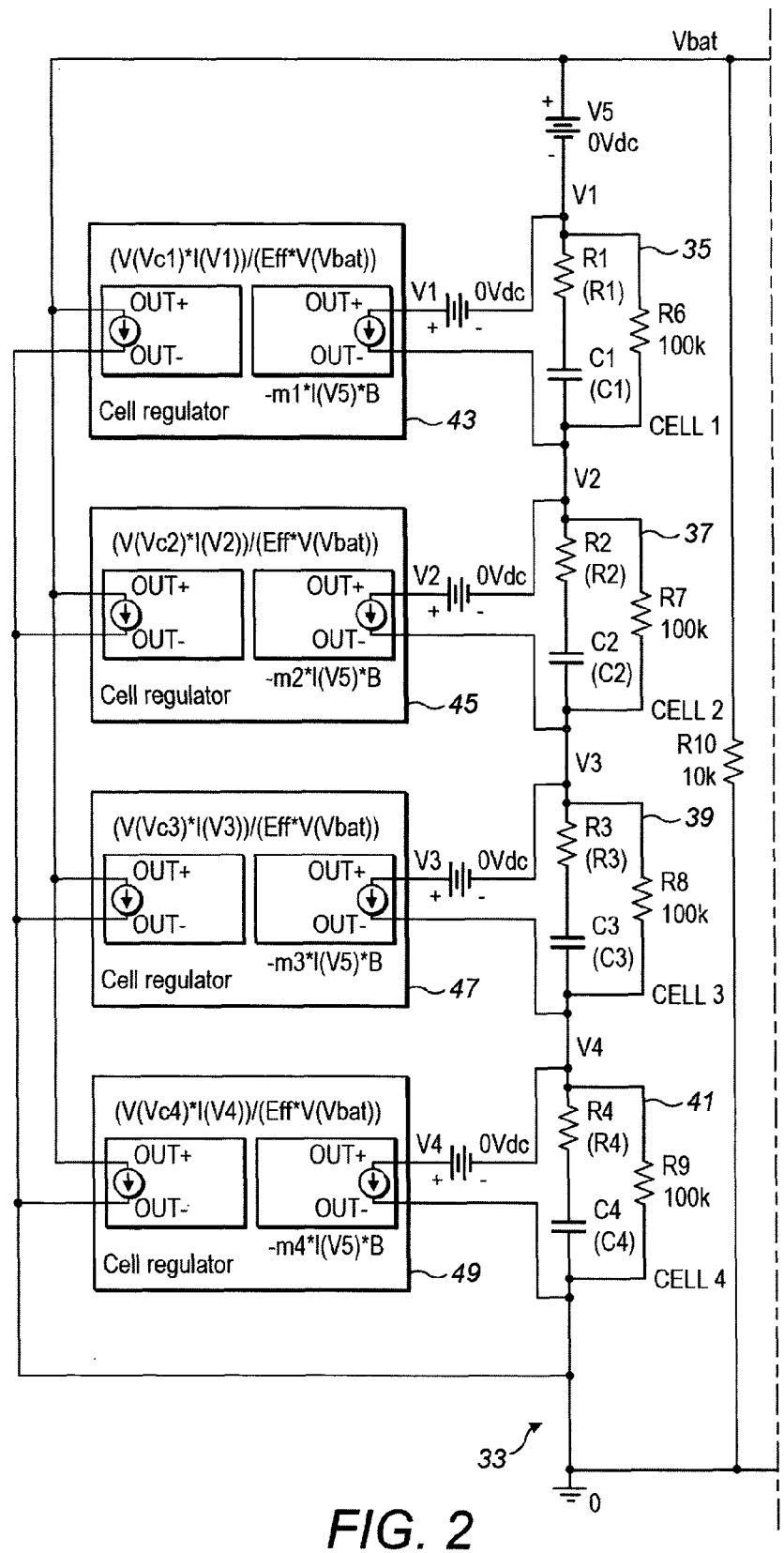
FIG. 2 is a circuit diagram of an example of a battery in accordance with the present invention measuring battery discharge.
Figure 2:
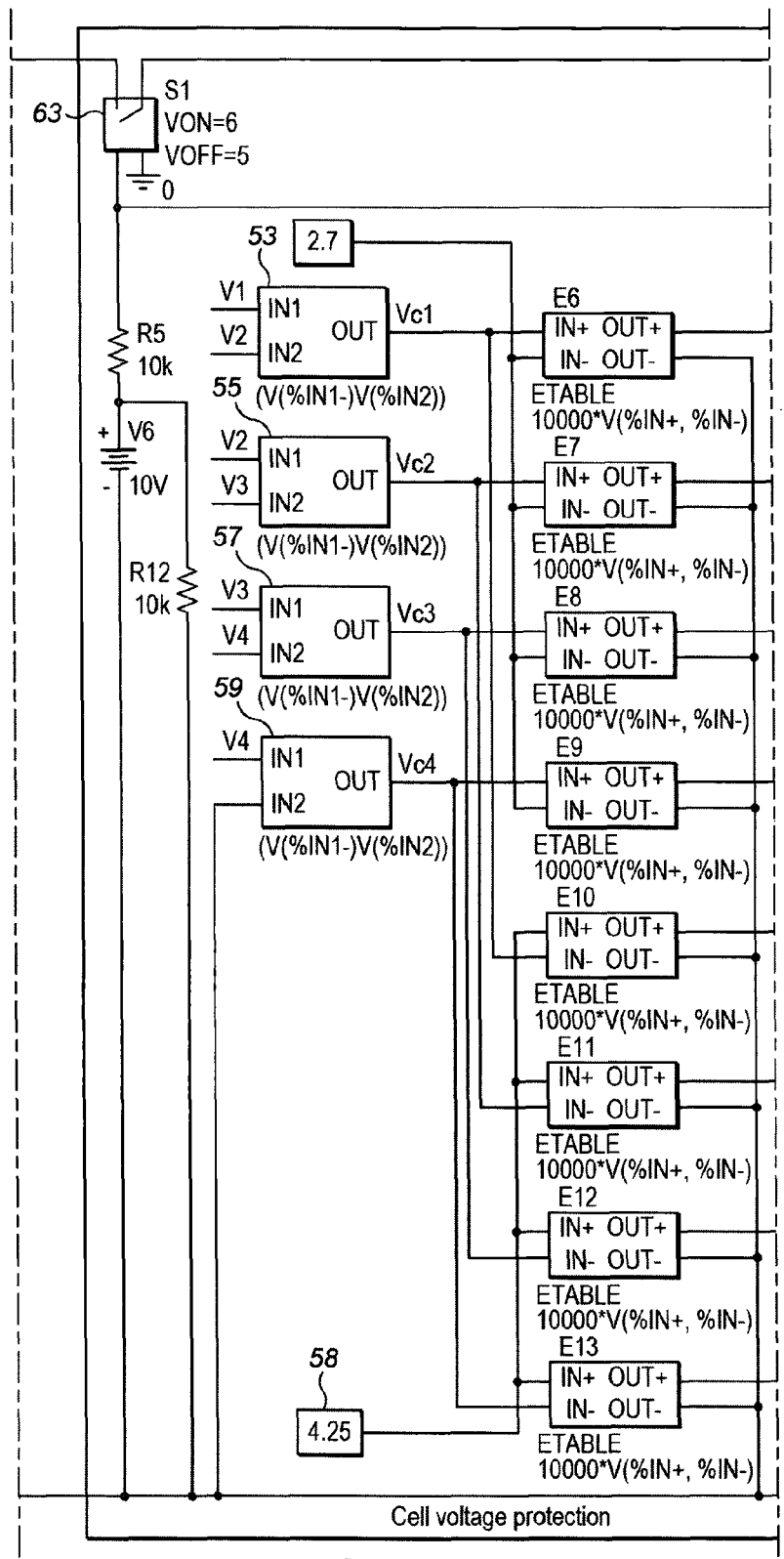
Figure 2:
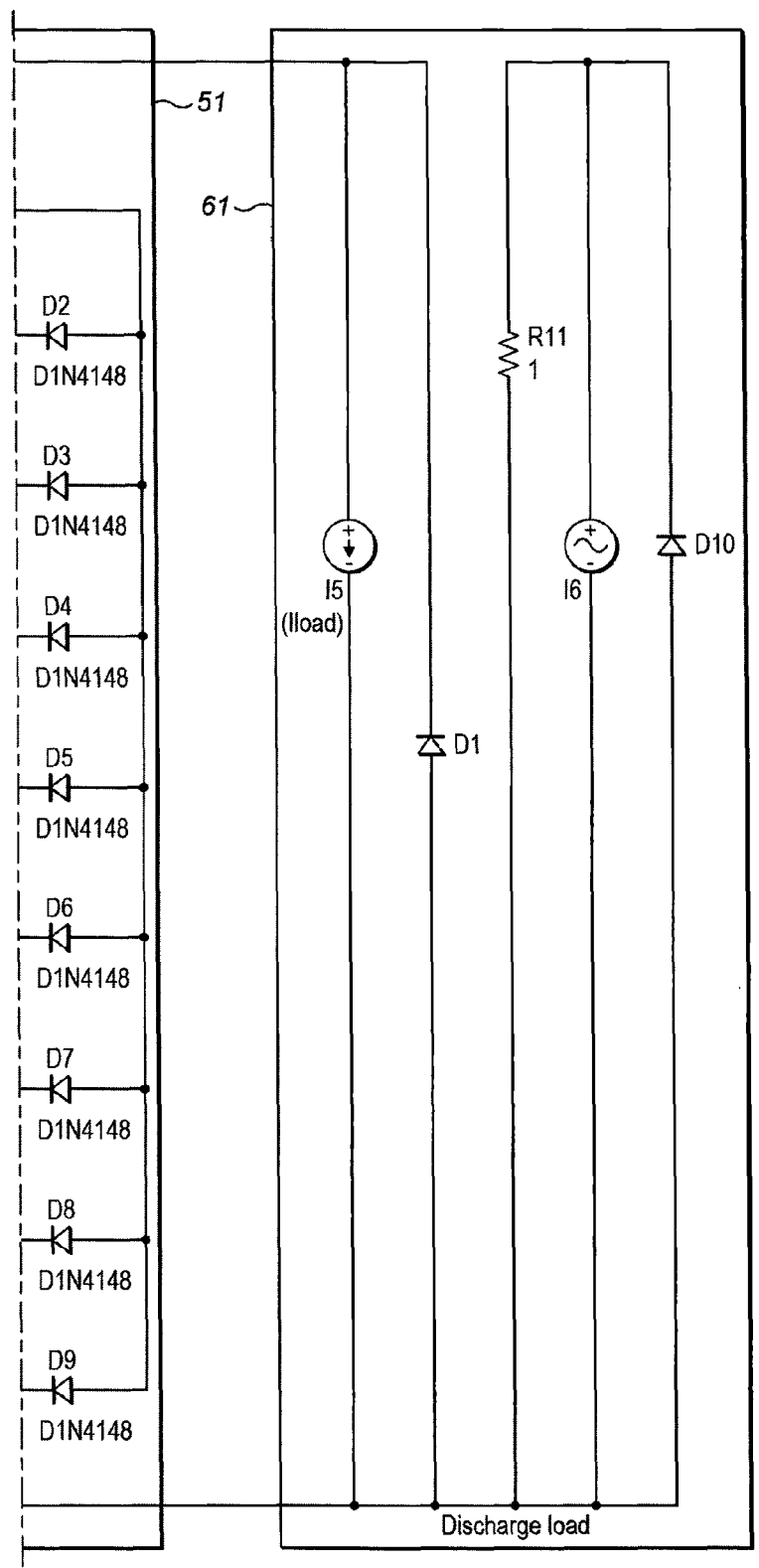

In FIG. 2, the measurement of the battery discharge current is shown. FIG. 2 comprises a Circuit 31 with a battery 33 having four cells labelled with reference numerals 35, 37, 39 and 41. Each cell 35, 37, 39 and 41 is connected to cell regulator, DC/DC converters 43, 45, 47 and 49 respectively.

The circuit further comprises a comparator 51 which has four primary comparator circuits 53, 55, 57 and 59 in which:

Comparator 53 compares V 1 from cell 35 with v 2 from cell 37;

Comparator 55 compares V 2 from cell 37 with V3 from cell 39;

Comparator 57 compares V 3 from cell 39 with V4 from cell 41; and

Figure 3:
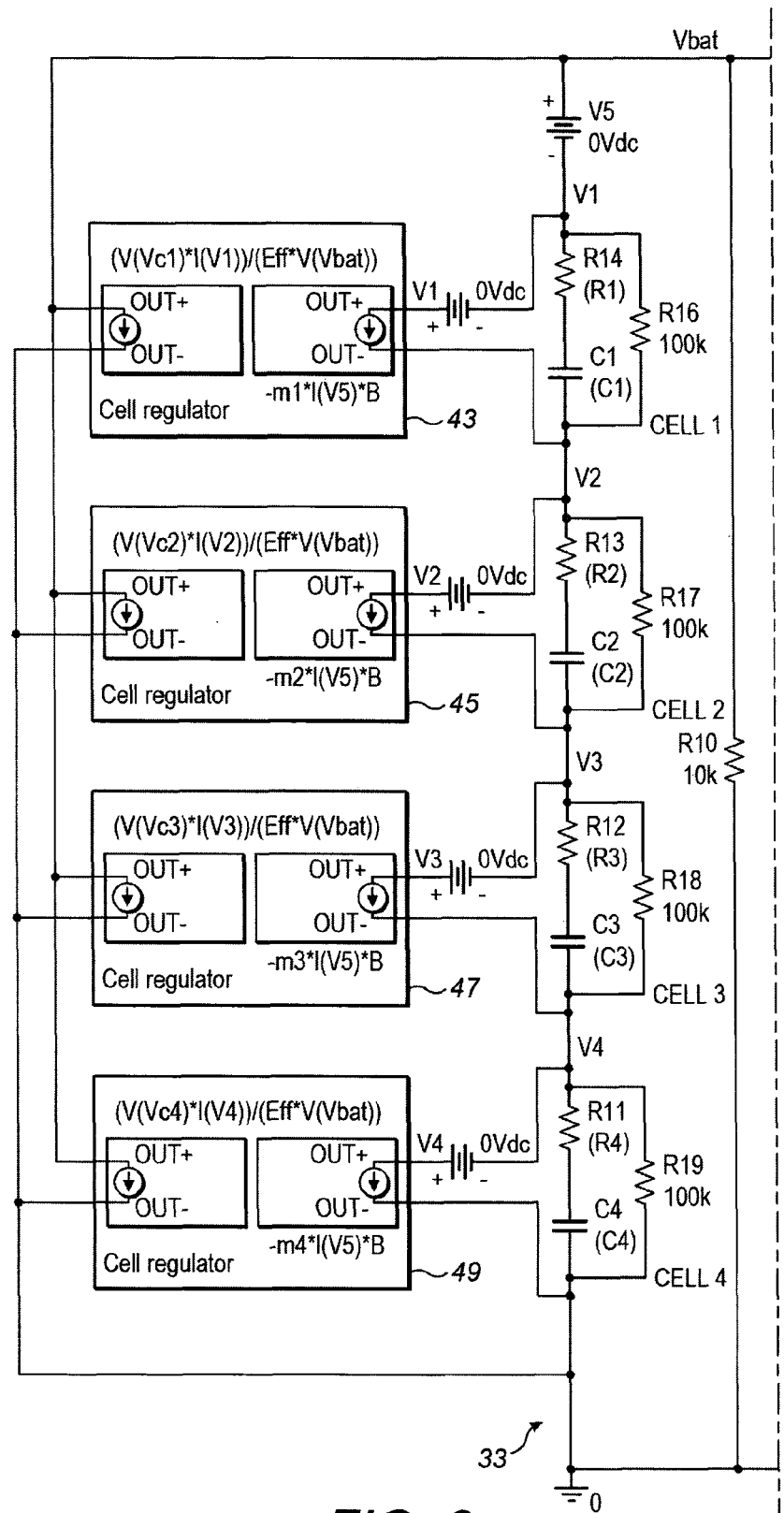
FIG. 3 is a circuit diagram of an example of a battery in accordance with the present invention measuring battery charge.
Figure 3:
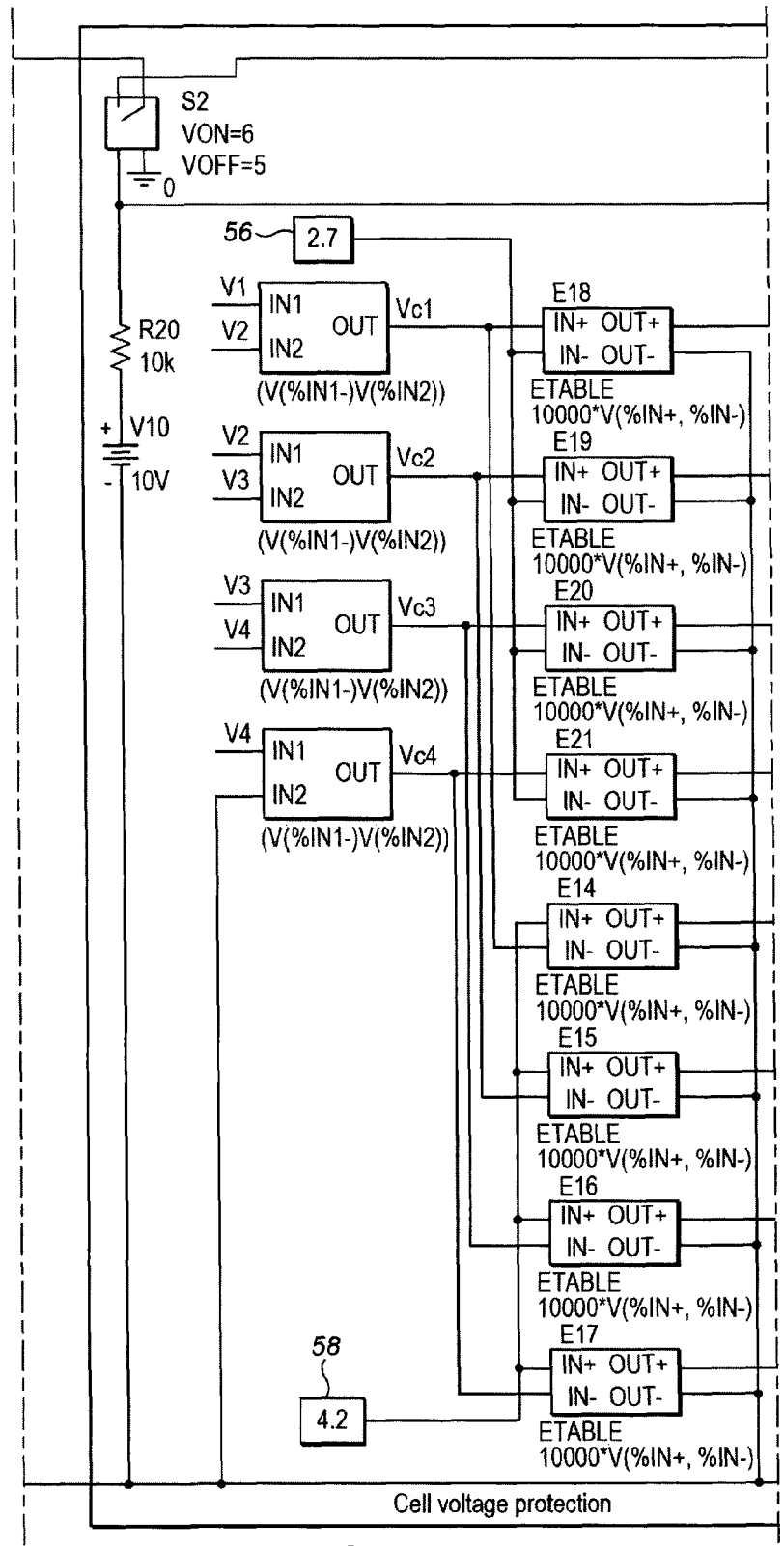
Figure 3:
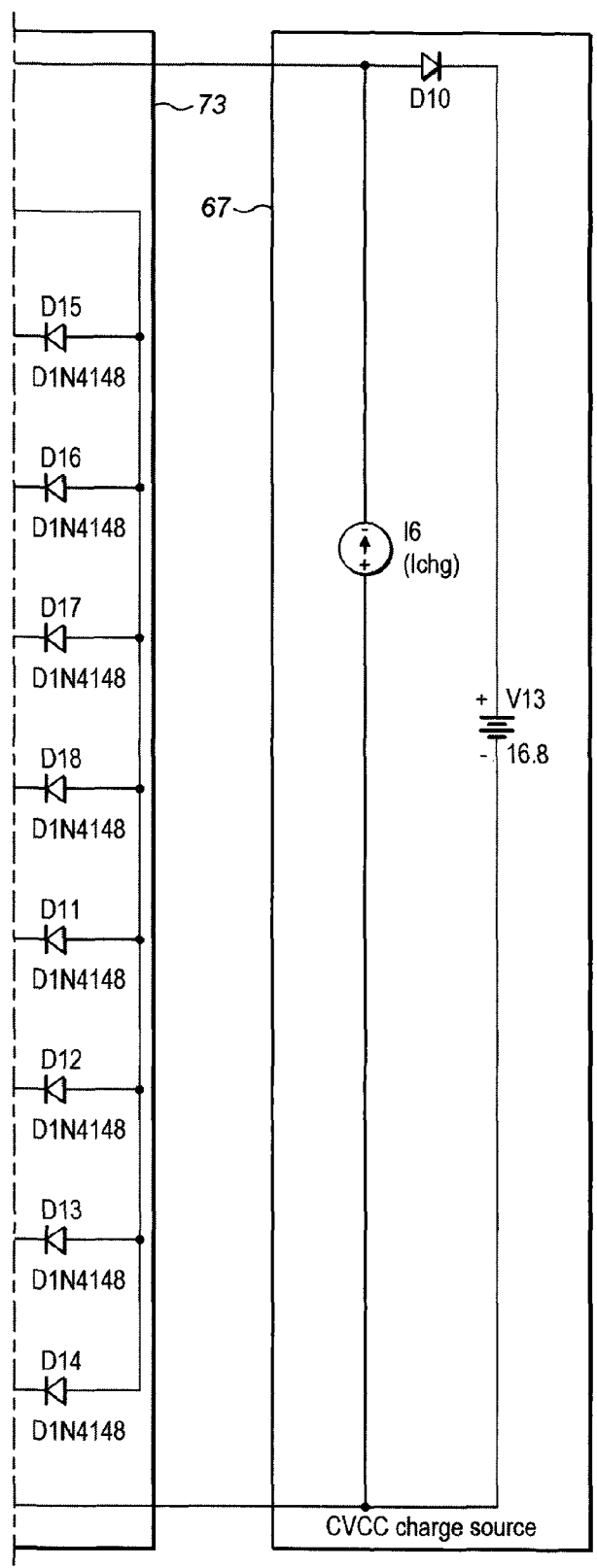

Comparator 59 compares V4 from cell 41 with v 2 with the cell protection voltage 65 which is set at a level below which discharge of the cells is not permitted. The comparators on FIGS. 2 and 3 are for the operation of the protection switch.

The output values from the comparators VC1, VC2, VC3 and VC4 are further compared with inputs and 58 in the second stage using comparators E6 to E 13 to achieve the operation of Switch 63 to prevent discharge below a certain level.

The charge model shown in FIG. 3 comprises a circuit as described with reference to FIG. 2. To the extent of similar components have been used the same reference numerals have been used. FIG. 3 comprises a circuit 31 with a battery 33 having four cells labelled with reference numerals 35, 37, 39 and 41. Each cell 35, 37, 39 and 41 is connected to cell regulator, DC/DC converters 43, 45, 47 and 49 respectively.

The circuit further comprises a comparator 73 which has four primary comparator circuits 75, 77, 79 and 81 in which:

Comparator 75 compares V 1 from cell 35 with v 2 from cell 37;

Comparator 77 compares V 2 from cell 37 with V3 from cell 39;

Comparator 79 compares V3 from cell 39 with V4 from cell 41; and

Comparator 81 compares V4 from cell 41 with V2 with the cell protection voltage 65.

The output values from the comparators VC1, VC2, VC3 and VC4 are further compared with inputs 56 and 58 in the second stage using comparators E14 to E21.

In this case the circuits used to provide a support current to the cells. The support current is provided preferentially to the strongest charge cells in charge mode because it is desirable to charge them faster and to provide to them as much charge as possible.

In the present invention, the battery charge and discharge current is measured and summed with each cell charge current to determine each cell current which is then integrated to obtain a measure of individual cell capacity.

For example, the circuits of FIGS. 2 and 3 constantly acquire each cell's raw capacity data by the coulometric determination of each series connected cell capacity, this involves the measurement of each cell's current. It then determines the ranking order of cell capacities normalised to the highest capacity cell. The required cell specific supporting current for the given load is then calculated for each cell based on the relative cell mismatch.

The effective capacity of any cell is affected by the cell's temperature and the rate of charge/discharge. To obtain an accurate indication of cell capacity the measurement described above must be compensated for temperature and rate. The state of art involves the use of lookup tables derived from the cell manufacturer's characterisation data to scale a capacity reading. This is a static process, only accurate at a number of finite discrete levels and does not factor cell ageing.

To achieve an enhanced level of state of charge determination of the battery, each cell capacity measurement as described above is compensated for both temperature and current by a cell specific normalised polynomial equation factoring both cell temperature and cell current as variables. This provides a dynamic measurement responding to each cell temperature and current (expressed as rate). With the above cell balancing algorithm implemented the actual effective battery capacity can be expressed as an average of all the compensated cell capacities.

The necessary supporting current for cell is described by the equation:

$$Is_{celln} = (M_{celln} \times I_{bat}) \quad (1)$$

The capacity of Cell$_n$ is calculated as:

$$C_{celln} = P_{celln} / Is_{celln} \quad (2)$$

Where:
Is$_{celln}$=Cell$_n$ Support Current
M$_{celln}$=Matching Ratio of Cell$_n$ Normalised to Highest Capacity Cell
I$_{bat}$=Total Battery Current
P$_{celln}$=Polynomial Equation Factoring T$_{celln}$ and I$_{celln}$
T$_{celln}$=Temperature of Cell$_n$
I$_{celln}$=Current Flow in Cell$_n$
This Invention Provides an Effective Battery Capacity of:

$$C_{bat} = (\Sigma C_{celln}) \div n \quad (3)$$

Without the invention the Effective Battery Capacity is:

$$C_{batn} = \min(C_{cell1} : C_{celln}) \quad (4)$$

Where:
C$_{bat}$=Effective battery capacity with invention
C$_{batn}$=Effective battery capacity without invention The equations (1) and (2) are the basis of an algorithm which is programmed into computing means which applies a compensation factor to the cell capacity measurement for each individual series connected cell in the battery pack. In one example of the present invention, processing means are provided such that the algorithm of the computer program is applied to each cell locally. A central processor can then access each cell's processed compensated data to determine the effective battery capacity for that sampled operating state. Regular sampling will provide the dynamic data required by the end user, for example in the form of a miles to empty gauge of an EV The degree of temperature and rate compensation accuracy depends on several factors including the order of the polynomial equation multiplier. Local processing power will dictate the practical implementation of the polynomial order.

An initial operating point for cell capacity can be obtained from the cell manufacturer or set at a level indicated by the cells open circuit voltage from a nominal cell voltage verses capacity look up table. As the number of charge discharge cycles build up the initial operating point is modified to reflect the actual working capacity. To achieve full calibration of cell capacity a complete charge discharge cycle is required.

Figure 4:
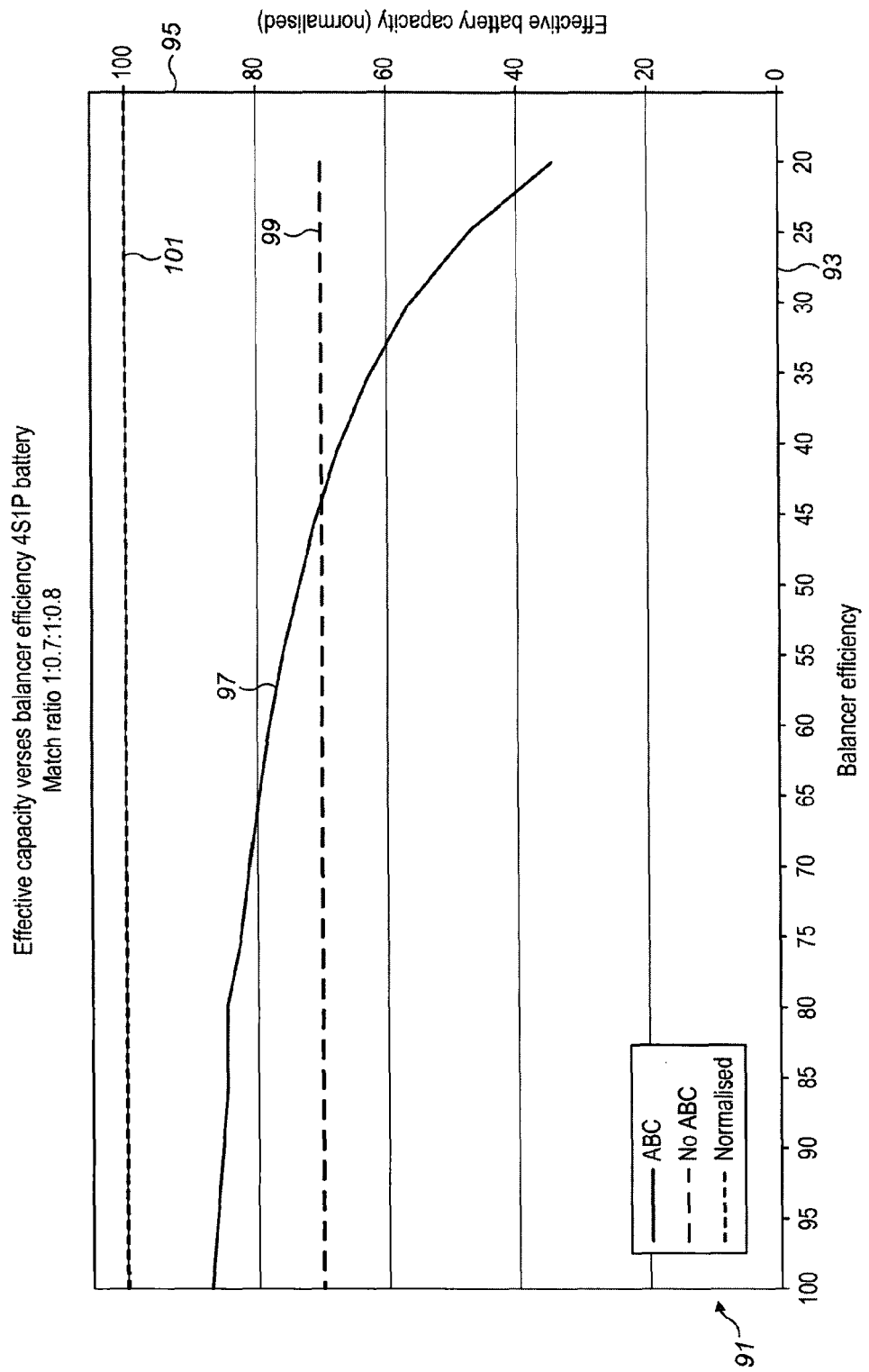
FIG. 4 of is a graph of effective capacity versus cell balancer efficiency.

FIG. 4 is a graph 91 which shows balancer efficiency on its X axis 93 and normalised battery capacity 95 on is Y axis. Curve ACB 97 is a plot of balancer efficiency against normailised battery capacity for a battery with active cell balancing in accordance with the present invention. Curve 99 is a plot of balancer efficiency against normalised battery capacity for a substantially identical battery without active cell balancing. Curve 101 is a normalised curve. It can be seen that above balancer efficiencies levels of 40 to 45%, the effective battery capacity of the battery which uses active cell balancing in accordance with the present invention has greater capacity. At battery efficiencies of 80 to 90% which are readily achievable, normalised battery capacity can be 10 to 20% better.

In one embodiment of the present invention, the battery management system is used as a range indicator for an electric vehicle (EV). Advantageously, because the present invention dynamically compensates each cell for both battery load and temperature the indicated battery capacity will vary with the appliance usage. In the case of an EV, the indicated range would respond in much the same way as state of art range indicators on conventional liquid fuelled vehicles. As fuel demand is increased the range indicated would drop and then rise when the fuel demand is reduced thus providing a real time indication of range at the current rate of energy usage. Present art EV range indicators do not provide such responsiveness.

In this embodiment of the invention, the preferred implementation is for parameters Is$_{celln}$ and C$_{celln}$ to be processed locally at the cell. The effective battery capacity C$_{bat}$ should be calculated by the central battery management processor which collects all the cell data and handles external battery communication and internal cell protection. Cell chemistry specific parameters for the compensating polynomial equation can be derived from the manufacturer's cell data and laboratory characterisation. The initial cell capacity value can be provided by the cell manufacturer or from an open circuit cell voltage capacity look up table.

Figure 5:
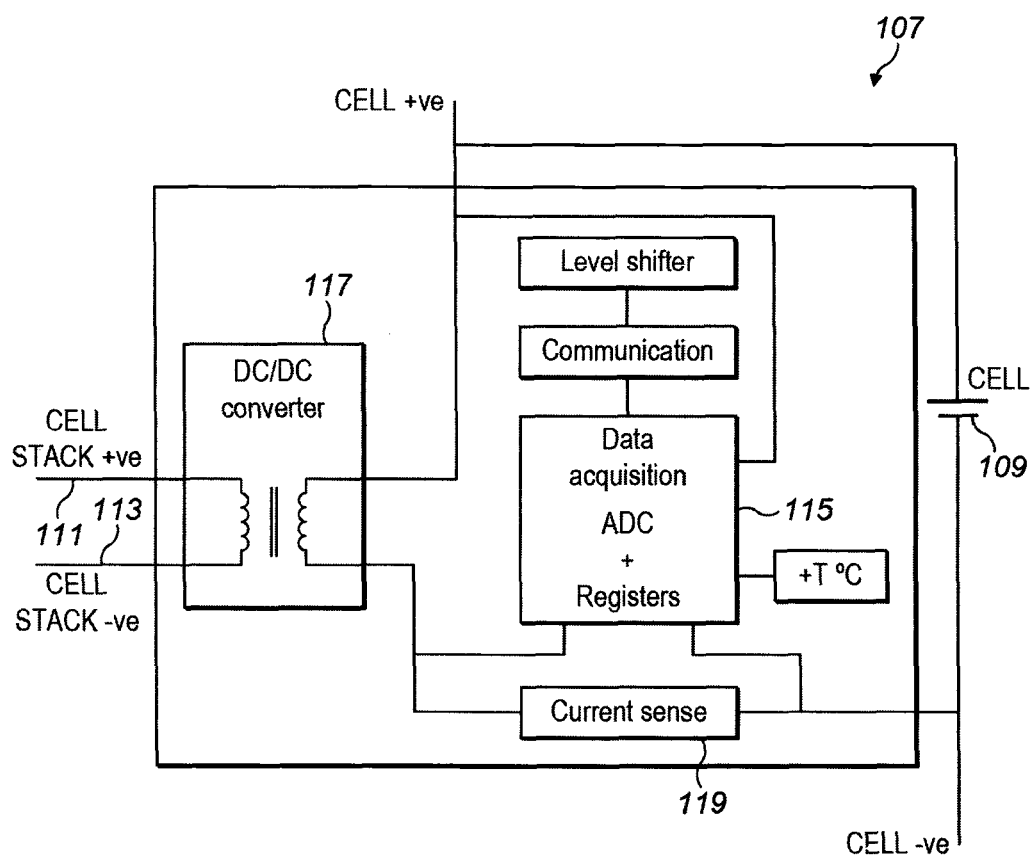
FIG. 5 is a circuit diagram showing another embodiment of the present invention.
Figure 6:
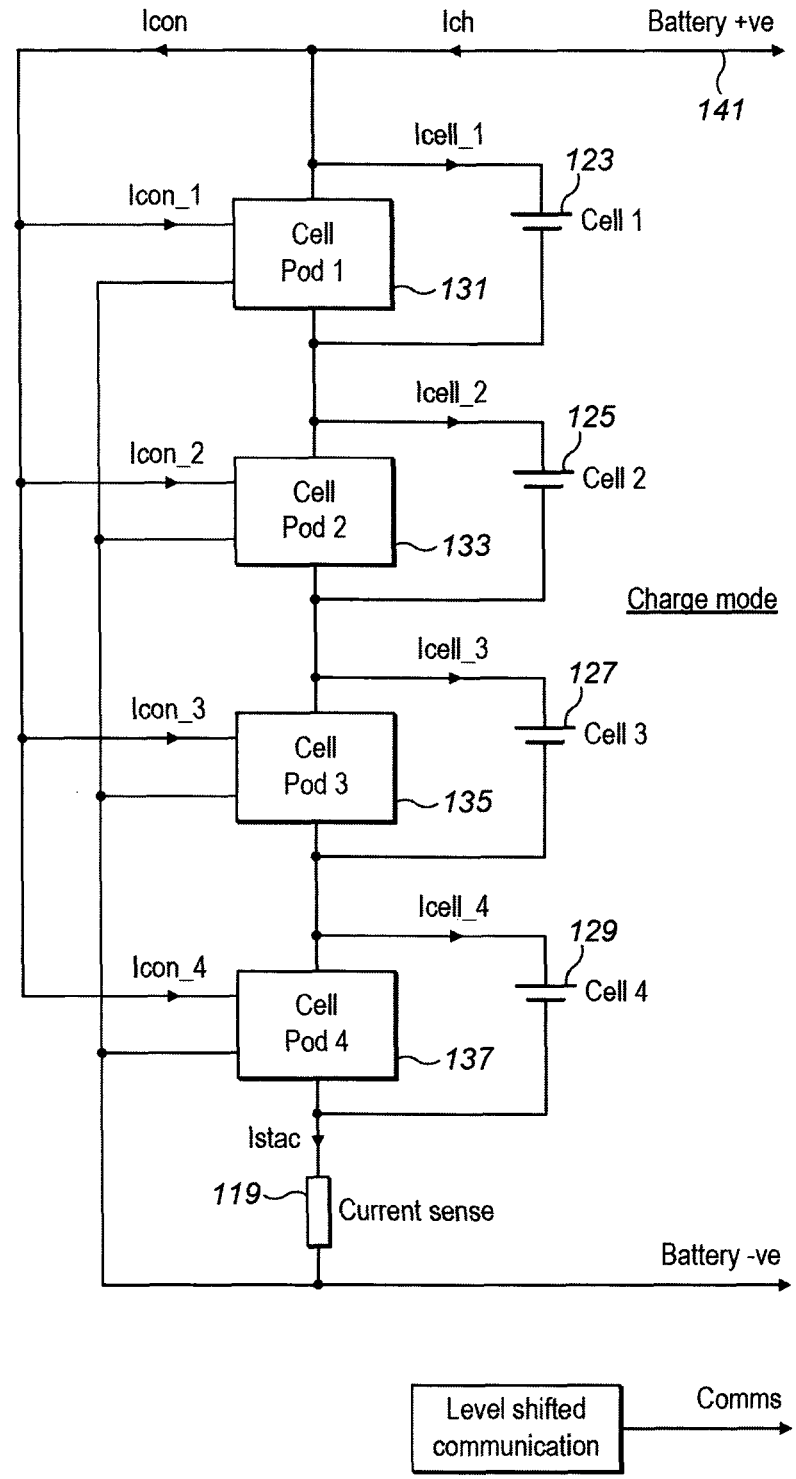
FIG. 6 is a circuit diagram showing another embodiment of the present invention
Figure 7:
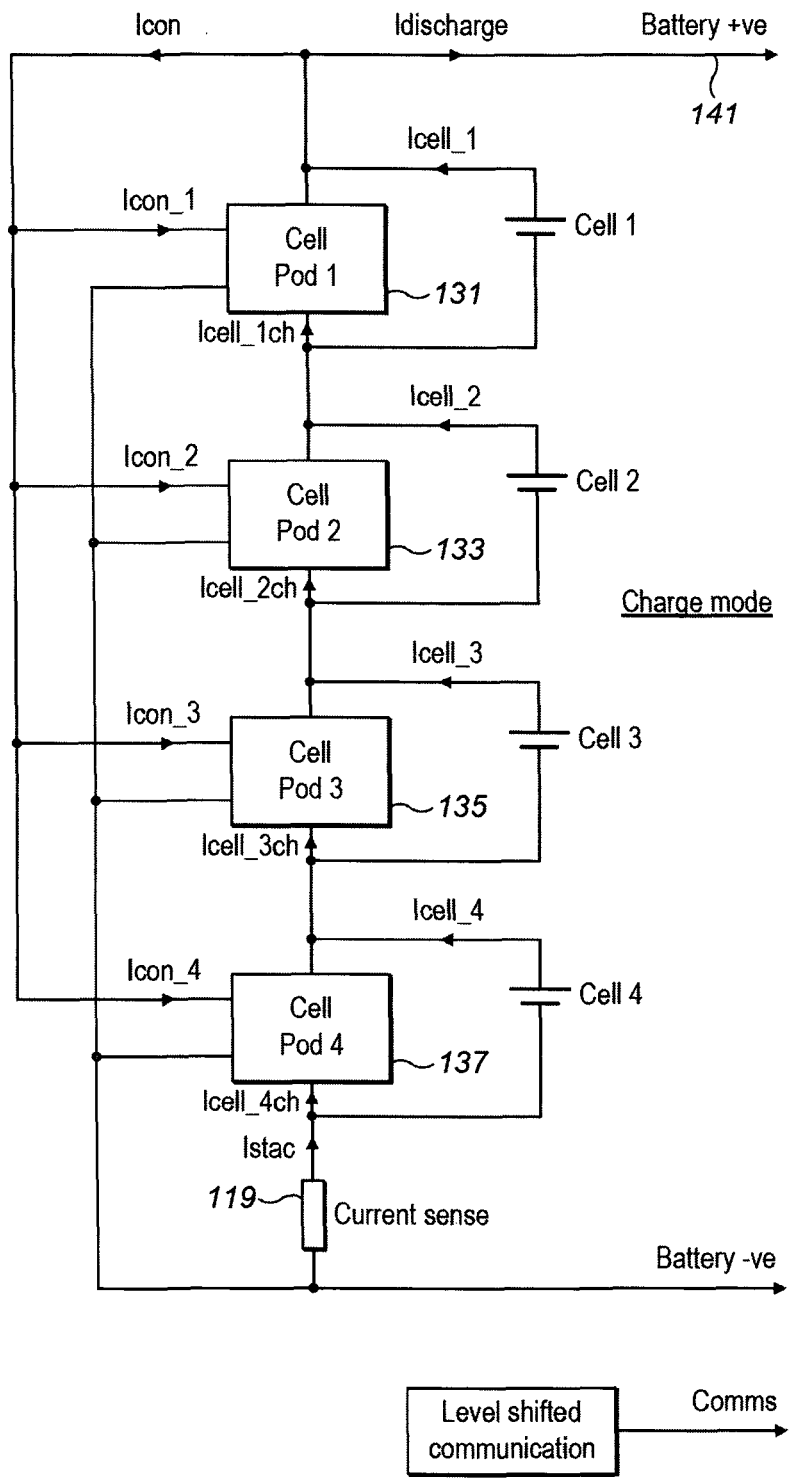
FIG. 7 is a circuit diagram showing another embodiment of the present invention

The embodiments described by FIGS. 5 and 6 and 7 would enable systems to be built that would support application to heavy industrial devices such as electric vehicles and standby battery banks that generally require terminal voltages exceeding 300V.

The main current sense element shown in FIGS. 6 and 7 measures the battery charge and discharge current. The current sense element shown in FIG. 5 measures the cell charge current derived from the DC/DC charger. The cell charge current being of a lower level requires a smaller and cheaper measuring device than previously required.

FIG. 6 shows the configuration of modules 131, 133, 135, and 137 shown in FIG. 5 (107) to implement a full active cell balancing system for a stack of four cells (123, 125, 127 an 129). The modular construction permits as many series connected cells as the rated isolation voltage of the DC/DC converter and communication system can tolerate. FIG. 6 shows a battery system being supplied by a Constant Current Constant Voltage (CCCV) charger connected across Battery +ve and Battery −ve terminals. At the start of the charge cycle a constant current, Ich, is supplied to the cell stack.

The battery charge and discharge current is measured using the current sensor 119 and summed with each cell charge current to determine each cell current which is then integrated to obtain a measure of individual cell capacity as described in detail above. A processor determines the ranking order of cell capacities normalised to the highest capacity cell. The required cell specific supporting current is calculated for the given load is then calculated for each cell using cell capacity data to give the relative cell mismatch and an algorithm which provides a compensation factor. The cell specific current value is provided to each cell.

FIG. 7 shows the discharge cycle where current is taken from the cell stack by DC/DC converter/converters to boost the cell voltage/voltages of cells that have a lower voltage using the battery management system in accordance with the present invention.

To maintain battery state of charge measurement accuracy over the battery operational life self-calibration schemes such as described by WO2010/001090 may be implemented. Further, it is possible that additional cell characterisation providing the cell ageing profile can be incorporated into the cell compensating polynomial equation. This would provide increased SoC accuracy without the use of calibration.

The algorithms can be used with a wide variety of energy storage devices that require balancing schemes to extract the best performance, such as fuel cells and super capacitors.

The present invention describes a means of simplifying the control implementation of the battery management system as described by WO2006/082425 to achieve higher levels of performance at a lower cost and lower component count.

The use of the present invention with Active Cell Balancing systems such as described by WO2006/082425 A1 can slow the cell ageing process by matching relative cell stress levels for any given operating environment. With all cells forced by supporting DC/DC converters to age at the same relative rate the battery is able to provide consistent performance and extended operational life.

Advantageously, the capacity balancing algorithm that can respond to changes in discharge and charge current.

The invention described provides increased accuracy of battery state of charge measurements, reduce its product cost, offer increased functionality and mitigate warranty risk, increase in fuel gauge accuracy, increase in available battery capacity and the extension of battery operating life.

The use of this disclosed algorithm with Active Cell Balancing systems such as described by WO2006/082425 A1 can slow the cell ageing process by matching relative cell stress levels for any given operating environment. With all cells forced by supporting DC/DC converters to age at the same relative rate the battery is able to provide consistent performance and extended operational life.

Improvements and modifications may be incorporated herein without deviating from the scope of the invention.

The invention claimed is:

1. A method for enhanced battery management of a battery comprising a plurality of cells, the method comprising steps of:
    measuring cell capacity value for each of two or more of said plurality of cells;
    ranking said two or more cells in an order based on the measured cell capacity values;
    calculating a value for a cell specific supporting current for each of said two or more cells measured for a given load, based upon the cell capacity values of the ranked cells; and
    providing the calculated cell specific supporting currents to said two or more cells.

2. The method as claimed in claim 1 wherein, the cell specific supporting currents are calculated to provide a higher current to cells with lower cell capacity values in order to minimize relative mismatches between cell capacity values in different cells.

3. The method as claimed in claim 2 wherein an effective delivered battery capacity can be expressed as an average of all compensated cell capacity values.

4. The method as claimed in claim 1, further comprising supporting weaker cells from a battery pack to allow effective delivered battery capacity to be increased by removing a restriction on a series connected weak cell with a lower capacity cell.

5. The method as claimed in claim 1, further comprising supporting the weak cells with an additional current to reduce effective stress on the weak cells thus ensuring that every series connected cell will age at a comparable rate thereby extending battery operational life.

6. The method as claimed in claim 1 wherein, the step of ranking said two or more cells comprises ranking in an order of cell capacity values normalized to a highest cell capacity value.

7. The method as claimed in claim 1 wherein, the step of measuring a cell capacity of each of two or more cells of said plurality of cells comprises coulometric determination of the cell capacity value of each of said two or more cells.

8. The method as claimed in claim 1 wherein, the step of measuring the cell capacity values of two or more cells of said plurality of cells comprises constantly acquiring cell capacity data.

9. The method as claimed in claim 1 wherein, the step of measuring the cell capacity values of two or more cells of said plurality of cells comprises measuring the currents of said cells.

10. The method as claimed in claim 1 wherein, the step of measuring a cell capacity value of each of two or more cells of said plurality of cells comprises: measuring battery charge current and battery discharge current, and summing them with cell charge current to determine each cell current which is then integrated to obtain a measure of an individual cell capacity.

11. The method as claimed in claim 10 wherein, the battery charge current and battery discharge current are measured using a current sense element.

12. The method as claimed in claim 11 wherein, the current sense element is embedded in the battery.

13. The method as claimed in claim 11 wherein, the current sense element carries both a battery load current and a primary support current, values of which are used to derive a cell support current.

14. The method as claimed in claim 10 wherein, the cell charge current derived from a DC/DC charger is measured using the current sense element.

15. The method as claimed in claim 1 wherein, a cell capacity measurement of the measuring is temperature compensated to provide a dynamic measurement responsive to each cell temperature.

16. The method as claimed in claim 1 wherein, a cell capacity measurement of the measuring is current compensated to provide a dynamic measurement responsive to each cell current.

17. The method as claimed in claim 1 wherein, the cell specific supporting currents are dynamically adjusted with a changing battery load.

18. The method as claimed in claim 1 wherein, the calculated cell specific supporting currents are provided to said two or more cells by a DC/DC converter.

19. A computer program comprising program instructions for implementing the method as claimed in claim 1.

20. A battery management system comprising:
a cell regulator;
an cell capacity measuring device;
a processor which receives measured cell capacity values from cells contained in a battery and ranks the cells in an order of their cell capacity values, and the processor is programmed to calculate a value for a cell support current for each cell based upon the ranked cell capacity values and provides an output to the cell regulator to provide calculated cell specific currents to the cells.

21. The battery management system as claimed in claim 20 wherein, the processor is programmed to calculate cell specific supporting currents which provide a higher current to cells with lower cell capacity values in order to minimize relative mismatches between cell capacity values in different cells.

22. The battery management system as claimed in claim 20 wherein, the processor ranks the cells in an order of cell capacity values normalised to a highest cell capacity value.

23. The battery management system as claimed in claim 20 wherein, the cell capacity measuring device measures cell capacity values of two or more of said cells using coulometric determination of each cell capacity value of each of said two or more cells.

24. The battery management system as claimed in claim 20 wherein, the cell capacity measuring device measures the cell capacity values of two or more of said cells by constantly acquiring cell capacity data.

25. The battery management system as claimed in claim 20 wherein, the cell capacity measuring device measures the cell capacity values of two or more of said cells by measuring currents of said cells.

26. The battery management system as claimed in claim 20 wherein, the cell capacity measuring device measures battery charge current and discharge current and the processor sums them with cell charge current to determine each cell current which is then integrated to obtain a measure of an individual cell capacity.

27. The battery management system as claimed in claim 20 wherein, the cell capacity measuring device is a current sense element.

28. The battery management system as claimed in claim 27 wherein, the current sense element is embedded in the battery.

29. The battery management system as claimed in claim 27 wherein, the current sense element carries both a battery load current and a primary support current the values of which are used to derive the cell support current.

30. The battery management system as claimed in claim 27 wherein, the processor is programmed with a correction factor algorithm to provide a correction factor which compensates a measured cell capacity value to account for variations in one or more physical parameters for each of the measured cells.

31. The battery management system as claimed in claim 30 wherein a physical parameter of said one or more physical parameters is temperature.

32. The battery management system as claimed in claim 30 wherein a physical parameter of said one or more physical parameters is current.

33. The battery management system as claimed in claim 20 wherein, the cell capacity measuring device also measures a cell current value derived from the cell regulator.

34. The battery management system as claimed in claim 20 wherein, the processor is programmed to calculate an effective battery capacity expressed as an average of all compensated cell battery capacity values.

35. The battery management system as claimed in claim 34 wherein, the processor comprises a central processing unit which accesses each cell's processed compensated data to determine the effective battery capacity for a sampled operating state.

36. The battery management system as claimed in claim 20 wherein, the processor is programmed to dynamically adjust the cell support currents with a changing battery load.

37. The battery management system as claimed in any of claim 20 wherein, the calculated cell support currents are provided to the cells by a DC/DC converter.

38. The battery management system as claimed in claim 20 wherein, the processor comprises a first processing means located at or near the cells of the battery and which implements the correction factor algorithm.

* * * * *